United States Patent [19]

Schmer

[11] Patent Number: 5,035,801
[45] Date of Patent: Jul. 30, 1991

[54] ANALYSIS MEMBRANES WITH IMPROVED COMPATIBILITY

[75] Inventor: Gottfried Schmer, Seattle, Wash.

[73] Assignee: Akzo NV, Arnhem, Netherlands

[21] Appl. No.: 174,092

[22] Filed: Mar. 28, 1988

Related U.S. Application Data

[63] Continuation of Ser. No. 671,434, Nov. 13, 1984, abandoned.

[30] Foreign Application Priority Data

Nov. 12, 1983 [DE] Fed. Rep. of Germany ....... 3341113

[51] Int. Cl.$^5$ .......................................... B01D 13/00
[52] U.S. Cl. .............................. 210/490; 210/500.24; 210/500.29; 210/500.35; 210/500.38
[58] Field of Search ............. 210/490, 500.24, 500.29, 210/500.35, 500.38, 506, 654, 655

[56] References Cited

U.S. PATENT DOCUMENTS

| | | | |
|---|---|---|---|
| 3,441,142 | 4/1969 | Oja | 210/321.3 |
| 3,877,978 | 4/1975 | Kremen et al. | 210/500.29 |
| 4,169,023 | 9/1979 | Sata et al. | 204/98 |
| 4,276,172 | 6/1981 | Henne et al. | 210/500.2 |
| 4,329,383 | 5/1982 | Joh | 210/500.2 |
| 4,377,610 | 3/1983 | Fydelor et al. | 210/500.38 |
| 4,415,455 | 11/1983 | Osei-Gyimah et al. | 210/654 |
| 4,444,663 | 4/1984 | Aoyagi et al. | 210/500.29 |
| 4,501,835 | 2/1985 | Berke | 210/654 |
| 4,668,396 | 5/1987 | Baurmeister et al. | 210/500.29 |
| 4,772,393 | 9/1988 | Pelger et al. | 210/500.24 |

FOREIGN PATENT DOCUMENTS

| | | |
|---|---|---|
| 26399 | 4/1981 | European Pat. Off. . |
| 1720087 | 6/1971 | Fed. Rep. of Germany . |
| 136702 | 7/1979 | Fed. Rep. of Germany 210/500.38 |
| 2705735 | 5/1982 | Fed. Rep. of Germany . |
| 3136573 | 6/1982 | Fed. Rep. of Germany . |
| 3341113 | 5/1985 | Fed. Rep. of Germany 210/500.24 |
| 136703 | 7/1979 | German Democratic Rep. . |
| 57-162701 | 6/1982 | Japan . |
| 57-162702 | 6/1982 | Japan . |
| 8003028 | 12/1981 | Netherlands . |

OTHER PUBLICATIONS

Merrill et al., "Antithrombogenic Cellulose Membranes", *Trans. Am. Soc. Artif. Int. Organs*, vol. XII, 1966, pp. 139–150.

*The Condensed Chemical Dictionary*, 10th Ed., G. G. Hawley, Van Nostrand Reinhold Co., N.Y., 1981, p. 522.

*Primary Examiner*—Peter Hruskoci
*Attorney, Agent, or Firm*—Michael J. Striker

[57] ABSTRACT

Dialysis membranes in the form of flat foils, tube foils or hollow fibers of regenerated cellulose are disclosed, with decreased leukopenia effect, in which polymeric acids are chemically bound at least to one membrane surface across bridge-formers chemically bound to the cellulose. Polyacrylic acid, polymethacrylic acid and/or polymaleic acid or also their copolymers with more than 5 Mol % acrylic acid- and/or methacrylic- and/or maleic acid- monomer building blocks come into question as polymeric acids. Celluloses modified with bridge formers are, in particular, amino celluloses, including thereunder also naturally-occurring species such as chitosan.

13 Claims, 1 Drawing Sheet

ANALYSIS MEMBRANES WITH IMPROVED COMPATIBILITY

This application is a continuation application of application Ser. No. 671,434, filed Nov. 13, 1984 now abandoned.

BACKGROUND OF THE INVENTION

The invention concerns a dialysis membrane for hemodialysis in the form of flat foils, tube foils or hollow filaments of regenerated cellulose.

Dialysis membranes of regenerated cellulose for hemodialysis, in the form of flat foils, tube foils or hollow filaments have been known for a long time, and are employed as before preferably in artificial kidneys, although many characteristics causing difficulties can still not be eliminated.

Thus a dialysis membrane for hemodialysis is known from DE-PS 27 05 735, with decreased thrombogenic activity of cellulose with chemically bound antithrombogenic compounds therein, whereby the dialysis membrane is composed of two or more layers of a cellulose regenerated from cuoxam cellulose solutions, which have each been obtained from separately fed slits of a spinning nozzle, whereby the cellulose layer disposed on the blood side is completely or partially of a modified cellulose which contains the antithrombogenic active substance chemically bound therein.

It has, however, already been suggested in DE OS 17 20 087 that the polymer material of the membrane be reacted with an alkyl halogenide and thereafter the obtained material be reacted with an alkali salt of an antithrombogenic compound with cationic group (e.g., heparin or a heparinoid compound) in order to decrease the danger of coagulation of the blood. Therewith also halogen alkyl dialkylamine have been ranked among the possible alkyl halogenides. Also cellulose, however, substantially cellulose acetate, numbers among the possible polymers.

Aside from the fact that dialysis membranes of synthetic or natural polymers can very easily cause a coagulation of the blood upon their employment in artificial kidneys, which is extensively prevented by means of appropriate treatment with medicaments or by means of the above-described particular dialysis membranes, there frequently occurs a further problem with dialysis membranes of regenerated cellulose, which previously could still not be satisfactorily solved, and indeed it has been established that with the treatment of a sick kidney with dialyzators with cellulose membranes a temporary leukocyte decrease can occur in the first period of the dialysis treatment. This effect is designated as leukopenia.

Leukopenia is a lowering of the leukocyte number (white blood cells) in the blood circulation. The number of white blood cells in humans amounts to about 4,000 up to about 12,000 cells/$mm^3$.

The leukopenia upon dialysis is most strongly pronounced 15/20 minutes after the start, whereby the neutrophiles (i.e., the leukocytes which are colorable with neutral or simultaneously with acid and basic dyes) can almost completely disappear. Thereafter, the number of leukocytes recovers within about one hour again to nearly the starting value, or exceeds this.

If after recover of the leukocytes a new dialyzator is connected, leukopenia occurs again to the same extent.

Cellulose membranes cause a pronounced leukopenia. Even if the clinical significance of the leukopenia is not scientifically clarified, there exists still a desire for a dialysis membrane for hemodialysis which does not display the effects of leukopenia, without thereby impairing the other very desirable characteristics of dialysis membranes of regenerated cellulose.

Surprisingly it has been discovered that a dialysis membrane of regenerated cellulose characterized in that at least at one membrane surface, bridge-forming polymeric acids are chemically bound to the cellulose, display a clearly decreased leukopenia, so that the number of leukocytes falls only to about 80% of the starting value, whereas with unaltered regenerated cellulose the number of leukocytes has fallen to about 20% of the starting value after about 15 minutes of dialysis time.

From DE OS 31 36 573 is known the production of a dialysis membrane of regenerated cellulose, for which production a liquid mass is employed which contains a reaction product of a copper ammonium cellulose with an ammonium- or alkali-metal salt of a polymerizate with 10 to 70 equivalent percent carboxyl groups and an average molecular weight number in the range from 500 up to 200,000, and a membrane is manufactured by means of shaping the particular mass into a dome- or foil-like shape, immersing the obtained shape in dilute sulfuric acid solution for its coagulation and regeneration, and subsequently, immersing the shape into a strongly basic solution for washing out the ammonium- or alkali-metal salt of the polymerizate (from the shaped body) and formation of fine pores (in the shaped body) corresponding substantially to the molecular weight of the salt.

SUMMARY OF THE INVENTION

In contrast to these known membranes, with which for the spinning mass a reaction product with an alkali- or an ammonium-salt of a polymerizate with 10 to 70 equivalent percent carboxyl groups, is spun and subsequently though the salt of the polymeric acid is washed out, according to the present invention at least one membrane surface, polymeric acids are bound to bridge-formers that are chemically bound to the cellulose. It should be pointed out that the carboxyl acid portion of the polymeric acid becomes bound to the membrane by the formation of linkages with the bridge-formers.

Coming into question as bridge-formers are all reactants which carry two reactionable groups, of which the one reacts with the cellulose molecule or cellulose derivative, such as nitrocellulose, which for example, with sodium amide becomes aminocellulose, and the other reacts with the polymeric acid. The reactionable groups can be the same or different.

Suitable for example, is even thienyl chloride, which in dimethylformamide reacts with the cellulose into chlorodeoxycellulose. This bridge-former is accordingly of definite interest, since thereby also the polymeric acids can be bound to the cellulose across an ester bond. Preferred are such bridge-formers which carry two of the same reactionable groups.

In principle, all polymeric acids are suitable for the dialysis membranes according to the present invention. Preferred are as homopolymers, polymethacrylic acid, polymaleic acid, and, particularly, polyacrylic acid, Also such dialysis membranes with which across bridge-formers copolymers of the mentioned polymeric acids are chemically bound to the cellulose are preferred embodiments of the invention, whereby the copolymers should contain more than 5 Mol-percent acrylic acid- and/or methacrylic acid- and/or maleic acid-monomer-building blocks. Examples of such copolymers are those with acrylamide, aryl acid- and/or methacrylic acid-esters and/or acrylonitrile. Less suitable are the copolymers with styrene as comonomer. Of particular interest are also the copolymers with which the comonomers are each disposed in blocks. Therewith the polymer should contain at least 2 blocks of polymeric acids.

Preferred bridge-formers are particularly alkylene diamine. These form, after oxidation of the surface of the regenerated cellulose with the aldehyde groups obtained by means of oxidation Schiff-type bases which effect a coloration of the membrane surface. Preferred in this connection is ethylene diamine. As belonging to the membrane surface are therewith to be understood those cellulose molecules in which a chemical reaction with the bridge-former can occur without a treatment decomposing the shape. They are seen to be thicker than only a mono-molecular layer.

Thus belonging as an embodiment of the invention is a dialysis membrane which is composed of at least two layers, which each have been obtained from separately fed slits of a spinning nozzle, whereby one of the layers—as indeed, the layer which upon hemodialysis comes into contact with the blood—contains a cellulose modified with bridge-formers, in which polymeric acids are chemically bound to the membrane surface.

Coming therewith into consideration as bridge-formers for the modified cellulose are the already mentioned compounds. In particular, however, such an embodiment allows for additional types of binding with the polymeric acids. Reaction conditions are partially necessary for substitution of cellulose, which are difficult to realize in a pre-shaped regenerated cellulose, or lead to too extensive reactions with the cellulose and, therefore, are unsuitable for a chemical reaction embracing only the membrane surface, or appear complicated.

As modified cellulose, in particular amino cellulose is preferred. Therewith obviously also naturally occurring modified amino cellulose such as chitosan, can be referred to. Thereby the additional process steps which are necessary upon introduction of amino-groups through chemical modification, can be avoided.

Cellulose which has been regenerated from cuoxam solutions offers with regard to purity, the smaller decomposition during the manufacturing process, but also clear advantages due to the better permeability, so that it is preferred for the dialysis membranes according to the present invention. Therewith are preferred such regenerated cellulose, the average molecular weight of which amounts to 80,000 up to 150,000. This can then be realized mainly when cotton inners are employed as cellulose raw material.

The regeneration from cuoxam solutions is also advantageous when a multi-layer membrane is supposed to be manufactured, whereby the modified cellulose is fluoroxy cellulose. This is operable without difficulty, namely up to a degree of substitution of the cellulose of 0.6 in the cuoxam solutions. Since essentially lower degrees of substitution are already sufficient in order to chemically bind a sufficient amount of polymeric acid, adjustment of the regeneration technique is not necessary.

It has turned out that only with relatively high-molecular polymeric acids is the aim according to the present invention attained, whereby the necessary average molecular weight is directed according to the average molecular weight of the regenerated cellulose. Preferably, the average molecular weight of the polymeric acids should amount to 0.5 up to 5 times the average molecular weight of the regenerated cellulose.

Insofar as regenerated cellulose with relatively low molecular weight is employed, the average molecular weight of the polymeric acids should amount to 50,000 up to 500,000.

The novel features which are considered as characteristic of the present invention are set forth in particular in the appended claims. The invention itself, however, as to its construction and method of operation, together with additional objects and advantages thereof, will be best understood from the following description of specific embodiments.

BRIEF DESCRIPTION OF THE DRAWING

In the drawing figure:

The figure is a graph illustrating the comparative testing results achieved during the dialysis of sheep wherein Curve "A" shows the leukocyte decrease, measured against time in minutes, when a conventional dialysis membrane is employed, while Curve "B" shows the leukocyte decrease when a dialysis membrane, made in accordance with the present invention, is used.

DESCRIPTION OF THE PREFERRED EMBODIMENTS

EXAMPLE

Figure 1:
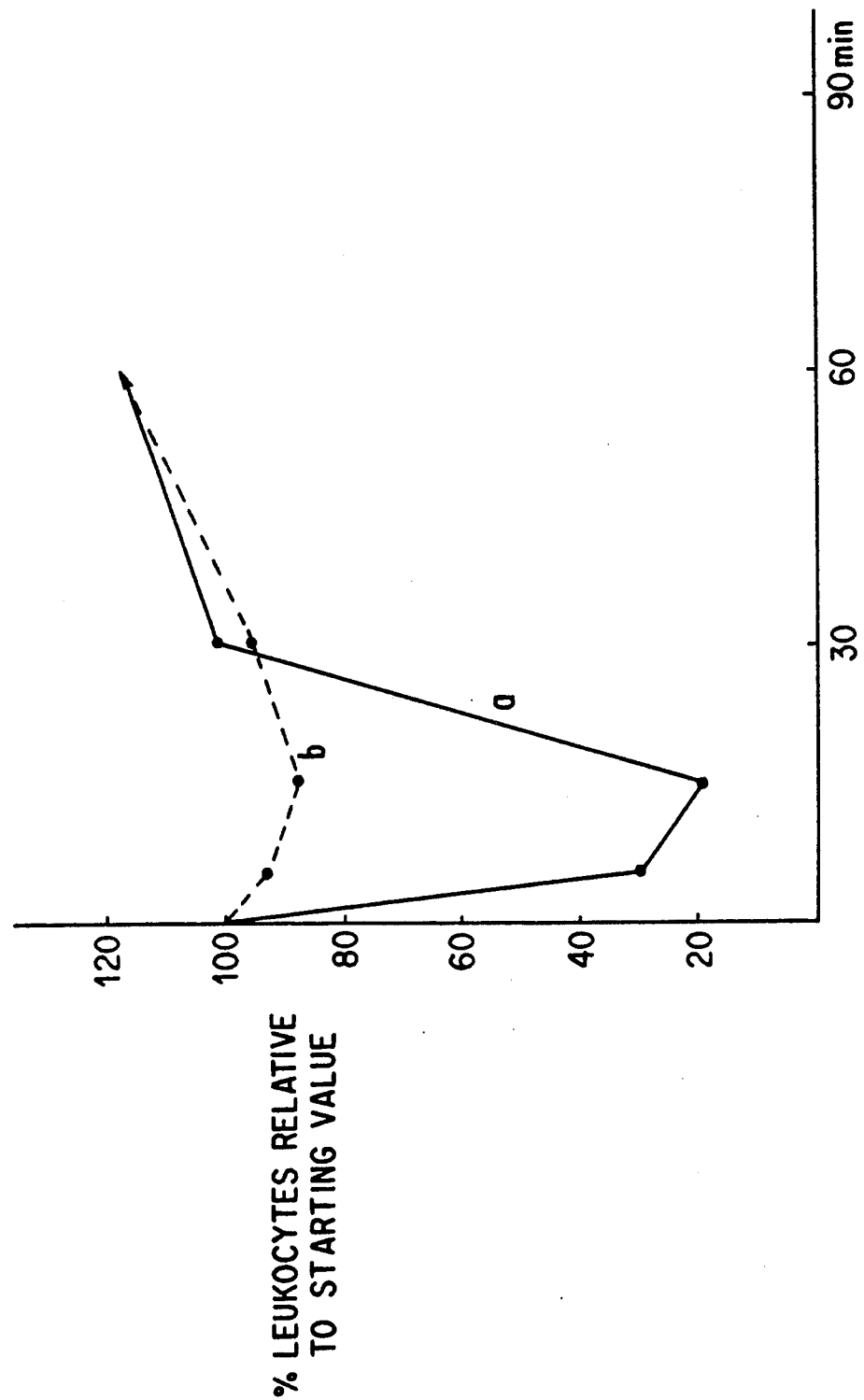

The following described tests are performed with typical commercial hollow fiber dialyzators with 1.0 $m^2$ exchange surface. The hollow fibers are composed of cellulose regenerated from cuoxam solution, with an average molecular weight of 120,000. The lumen diameters amount to 200 $\mu m$ and the wall thickness is 11 $\mu m$.

The lumens of the hollow fibers of such dialyzators, which during hemodialysis represent the blood side, are filled with sodium periodate solution (20 g/l) and allowed to react at room temperature for 1 hour. After washing out of the periodate with water, follows a 24-hour treatment with a 5% by weight solution of ethylene diamine in 0.01 molar 2-(n)-morpholine ethane sulfonic acid at pH5. A Schiff-base, which effects a yellow coloration to the membrane surface, forms between the aldehyde groups of the glucose rings of the cellulose obtained by means of oxidation, and the ethylene diamine.

The pH-value is adjusted to 9 by means of addition of alkali solution, and subsequently the Schiff-base is reduced to amine by means of pumping of a dispersion of sodium borohydride in water at 4° C. Subsequently, the hollow fibers are rinsed with physiological saline.

An aqueous solution of 1% by weight polyacrylic acid with a molecular weight of 250,000 and 0.5% by weight water-soluble N-cyclohexyl-N'-($\beta$-[N-methylmorpholino]-ethyl)-carbodiimide-p-toluene sulfonate is pumped through the dialyzator for 24 hours at room temperature with with pH5. The carbodiimide serves for the formation of a reactive ester with the carboxyl groups of the polyacrylic acid, which with the amino groups of the bridge-former, which are bound chemically to the cellulose, leads to formation of amide linkages.

After an intensive rinsing with 0.9% by weight NaCl solution, the drop in leukocytes is determined in vivo tests with sheep in comparison to untreated cellulose hollow fibers.

With the dialysis of sheep there occurs, as with the treatment of uremics, in the first 20 minutes of the treatment with dialyzators having cellulose membranes which are untreated, a leukocyte drop to 20% of the starting value (see FIG. 1, curve A).

However, when a dialyzator is employed which as described above has been treated and with which in the membranes, at least at the membrane surface which comes into contact with the blood, polyacrylic acid has been chemically bound across bridge-formers chemically bound to the cellulose, there occurs in the first 20 minutes with corresponding dialysis treatment of sheep in vivo a leukocyte decrease to about 85% of the starting value (FIG. 1, curve B).

The results of the comparison are graphically represented in FIG. 1. The strong extent to which a decrease in the leukocyte drop occurs with the membrane according to the present invention is clearly recognizable. With other polymeric acids, such as those that have been mentioned above, and with other named bridgeformers, one obtains analogous results.

While the invention has been illustrated and described as embodied in dialysis membranes with improved compatibility, it is not intended to be limited to the details shown, since various modifications and structural changes may be made without departing in any way from the spirit of the present invention.

Without further analysis, the foregoing will so fully reveal the gist of the present invention, that others can, by applying current knowledge, freely adapt it for various applications without omitting features, that from the standpoint of prior art, fairly constitute essential characteristics of the specific or generic aspects of this invention.

What is claimed as new and desired to be protected by Letters Patent, is set forth in the appended claims.

I claim:

1. A dialysis membrane for reducing a leukopenia effect which is formed as a flat foil, a tube foil or a hollow fiber or regenerated cellulose comprising a membrane surface having a polymeric acid chemically bound across a bridgeformer chemically bound to the cellulose, said bridgeformer being chemically bound with said polymeric acid across amide linkages, said bridgeformer being an alkylene diamine, said polymeric acid being selected from the group consisting of polyacrylic acid, polymethacrylic acid, polymaleic acid, a copolymer with more than 5 Mol % acrylic acid, methacrylic acid or maleic acid monomer building blocks, and a combination thereof, said regenerated cellulose having an average molecular weight of between 80,000 and 150,000 and said polymeric acid having an average molecular weight of between 50,000 and 500,000.

2. The dialysis membrane according to claim 1, wherein said alkylene diamine bridgeformer is ethylene diamine.

3. The dialysis membrane according to claim 1, wherein said membrane includes at least two layers which have each been obtained from separately fed slits of a spinning nozzle, whereby one of said layers contains a cellulose modified with bridgeformers.

4. The dialysis membrane according to claim 3, wherein said cellulose modified with bridgeformers is an amino cellulose.

5. The dialysis membrane according to claim 4, wherein said amino cellulose is chitosan.

6. The dialysis membrane according to claim 1, wherein said cellulose is a cellulose regenerated from cuoxam solutions.

7. A dialysis membrane for reducing a leukopenia effect which is formed as a flat foil, a tube foil or a hollow fiber of low-molecular weight regenerated cellulose comprising a membrane surface having a high-molecular weight polymeric acid chemically bound across a bridgeformer chemically bound to the cellulose, said bridgeformer being chemically bound with said polymeric acid across amide linkages, said bridgeformer having two reactionable groups wherein one group is capable of reacting with a member selected from the group consisting of a cellulose molecule of said regenerated cellulose and a cellulose derivative, and a second of said two reactionable groups is capable of reacting with said polymeric acid, said regenerated cellulose having an average molecular weight of between 80,000 and 150,000 and said polymeric acid having an average molecular weight of between 50,000 and 500,000.

8. The dialysis membrane according to claim 7, wherein said bridgeformer is ethylene diamine.

9. The dialysis membrane according to claim 7, wherein polymeric acids, which are chemically bound to the bridgeformer, are selected from the group consisting of polyacrylic acid, polymethacrylic acid, polymaleic acid, a copolymer with more than 5 Mol % acrylic acid, methacrylic acid or maleic acid monomer building blocks, and a combination thereof.

10. The dialysis membrane according to claim 7, wherein said membrane includes at least two layers which have each been obtained from separately fed slits of a spinning nozzle, whereby one of said layers contains a cellulose modified with bridgeformers.

11. The dialysis membrane according to claim 10, wherein said cellulose modified with bridgeformers is an amino cellulose.

12. The dialysis membrane according to claim 11, wherein said amino cellulose is chitosan.

13. The dialysis membrane according to claim 7, wherein said cellulose is a cellulose regenerated from cuoxam solutions.

* * * * *